United States Patent Office 2,791,617
Patented May 7, 1957

2,791,617

NITRATION OF AROMATIC COMPOUNDS

Richard Clyde Glogau, West Chester, Pa., assignor to E. I. du Pont de Nemours and Company, Wilmington, Del., a corporation of Delaware No Drawing. Application November 1, 1955, Serial No. 544,359

3 Claims. (Cl. 260—645)

This invention relates to an improved process for the preparation of aromatic nitro compounds, and, more particularly, to a process for the preparation of nitrobenzene.

Aromatic nitro compounds are usually prepared by nitrating aromatic hydrocarbons by means of a mixed acid comprising sulfuric acid and nitric acid in variable proportions, allowing the resulting mixture of nitro compound and waste acid to separate into layers, drawing off the acid layer, and finally subjecting the nitro compound to washing and neutralizing operations. Frequently, however, the mixtures of nitro compound and waste acid obtained are very difficult to separate within a reasonable length of time, and, in some cases, the mixtures cannot be separated satisfactorily even after prolonged periods of time. The economic disadvantages of this slow and incomplete separation are immediately evident. Furthermore, during the washing step, difficulties are often encountered when attempts are made to effect rapid and satisfactory separation of the nitro compounds from the wash water. In this step of the process, slow separation also proves extremely uneconomical, and incomplete separation leads to a product of insufficient purity. These unsatisfactory conditions result, for example, during the manufacture of nitrobenzene, dinitrobenzene, nitroxylene, and other related aromatic nitro compounds. In the case of nitrobenzene, such a persistent emulsion with the waste acid is formed that satisfactory separation is not possible.

Settling agents such as a silicious material and/or a soluble fluoride have heretofore been used to accelerate the separation of mixtures comprising aromatic nitro compounds and waste acids. Unfortunately, however, the nature of these substances causes them to be extremely troublesome during subsequent operations. These settling agents become entrained with the waste acid layer and also, to a certain degree, with the nitro compound layer. As a result of the presence of fluoride, severe corrosion is experienced in the process equipment and also in the acid-recovery equipment. In practice, the degree of corrosion has been so high as to necessitate the interruption of operations for the replacement of equipment at very frequent intervals. In addition, solid particles of silicious material are carried along to subsequent operations, and erosion adds to the corrosion problem. Furthermore, experience has shown that the use of solid materials of any kind to accelerate the separation of mixtures of aromatic nitro compounds with waste acids is undesirable not only from the standpoint of erosion caused by entrainment, but also because solids tend to collect in the process equipment. Periodically this condition necessitates uneconomical shutdowns so that the equipment may be cleaned out. Thus, it is evident that the use of the above settling agents is less than satisfactory in view of the high expenditures resulting from frequent replacement of equipment and frequent shutdowns.

In accordance with this invention, it has been found that difficult-to-separate mixtures of aromatic nitro compounds with waste acids are separated rapidly and effectively, and the disadvantages of the prior art overcome, when a small amount of tertiary-octylamine is added to the mixture as it enters the separating tank. As is known, tertiary-octylamine is the name in common usage for 2-amino-2,4,4-trimethylpentane.

Obviously the amount of separating agent needed will vary with different mixtures, depending on how difficult they are to separate. In the case of nitrobenzene-waste acid emulsions, for example, the amount of agent used may vary from 0.0025% to 0.0150%, based on the nitrobenzene charged. The amount of agent needed varies inversely with the nitric acid content of the nitrating acid, since less waste acid must be separated at the higher nitric acid concentrations.

The mixtures formed in the process of the present invention are separated with great rapidity and effectiveness. After a separation time of thirty minutes, the nitro compound layer may have a waste acid content of only 0.02%.

It has further been discovered that the use of tertiary-octylamine to separate aromatic nitro compounds from their waste acids also improves the separation of nitro compounds from their wash water in the washing step of the process due to entrainment of tertiary-octylamine with the nitrobenzene. The water content in the final product is found to be less than that in products obtained from previous processes, and a product of higher purity thus is obtained.

The following example is provided to describe the present invention more fully. However, it will be understood that this is by way of illustration only and is not to be taken as limiting the invention in any way.

Benzene was introduced continuously into the nitrator at a rate of 4500 pounds per hour, while mixed acid having a composition of 27% $HNO_3$, 59% $H_2SO_4$, and 14% $H_2O$ was added continuously at a rate of 13,250 pounds per hour. The mixture in the nitrator was agitated at 70° C.; the retention time was about 30 minutes. The nitrobenzene-waste acid emulsion formed was led continuously to a separator into which tertiary-octylamine was introduced at the rate of 0.48 pound per hour. Thus, based on a production of 6850 pounds of nitrobenzene per hour, the concentration of tertiary-octylamine was 0.0070%. Separation was essentially complete after about 30 minutes' retention time in the separator. The acid layer was withdrawn continuously from the separator, and the nitrobenzene layer led to the washing equipment to remove remaining traces of acid. The water content of the nitrobenzene layer after the washing operation was only 0.5 to 1.0%. With this invention, corrosion was greatly minimized, solid particles did not accumulate, and process and acid-recovery equipment could be operated satisfactorily for extended periods of time.

The above example illustrates a continuous method for carrying out the present process. However, the process may also be carried out by a batch method. Since many variations and modifications can be made without departure from the spirit of the invention, the scope is limited only by the following claims.

I claim:

1. In the process for manufacturing aromatic nitro compounds, the steps which comprise adding a small amount of tertiary-octylamine to the mixture of nitro compound and waste acid formed during the nitration step, allowing the said mixture to stratify, and separating the nitro compound from the waste acid.

2. In the process for manufacturing nitrobenzene, the steps which comprise adding a small amount of tertiary-octylamine to the nitrobenzene-waste acid mixture formed during the nitration step, allowing the said mixture to stratify, and separating the nitrobenzene from the waste acid.

3. In the process for manufacturing nitrobenzene, the steps which comprise adding 0.0025% to 0.0150% of tertiary-octylamine (based on nitrobenzene) to the nitrobenzene-waste acid mixture formed during the nitration step, allowing the said mixture to stratify, and separating the nitrobenzene from the waste acid.

No references cited.